US011206134B2

(12) United States Patent
Kumar et al.

(10) Patent No.: US 11,206,134 B2
(45) Date of Patent: Dec. 21, 2021

(54) SYSTEM AND METHOD FOR PROTECTION OF MULTIPART SYSTEM APPLICATIONS USING A CRYPTOGRAPHICALLY PROTECTED PACKAGE, A PACKAGE MAP AND A PACKAGE OBJECT STORE FOR DECRYPTION AND VERIFICATION AT RUNTIME ON THE TARGET DEVICE PLATFORM

(71) Applicant: MOCANA CORPORATION, Sunnyvale, CA (US)

(72) Inventors: Srinivas Kumar, Cupertino, CA (US); Shreya Uchil, Millbrae, CA (US); Srikesh Amrutur Srinivas, Cupertino, CA (US)

(73) Assignee: MOCANA CORPORATION, San Jose, CA (US)

( * ) Notice: Subject to any disclaimer, the term of this patent is extended or adjusted under 35 U.S.C. 154(b) by 234 days.

(21) Appl. No.: 16/691,706

(22) Filed: Nov. 22, 2019

(65) Prior Publication Data
US 2020/0177385 A1 Jun. 4, 2020

Related U.S. Application Data

(60) Provisional application No. 62/772,705, filed on Nov. 29, 2018.

(51) Int. Cl.
*H04L 9/14* (2006.01)
*G06F 21/45* (2013.01)
*G06F 21/44* (2013.01)
*H04L 9/08* (2006.01)
(Continued)

(52) U.S. Cl.
CPC ................. *H04L 9/14* (2013.01); *G06F 8/61* (2013.01); *G06F 8/65* (2013.01); *G06F 21/44* (2013.01);
(Continued)

(58) Field of Classification Search
CPC . G06F 21/45; G06F 21/44; G06F 8/61; G06F 8/65; H04L 9/0825; H04L 9/0822;
(Continued)

(56) References Cited

U.S. PATENT DOCUMENTS 6,249,866 B1 * 6/2001 Brundrett ............ G06F 12/1408
380/286
8,904,178 B2 * 12/2014 Wilding ................ H04L 63/061
713/171

(Continued)

OTHER PUBLICATIONS

Notification of Transmittal of the International Search Report (Forms PCT/ISA/220 and PCT/ISA/210) and the Written Opinion of the International Searching Authority (Form PCT/ISA/237) dated Mar. 24, 2020, by the International Application Division Korean Intellectual Property Office in corresponding International Application No. PCT/US2019/062722. (9 pages).

*Primary Examiner* — Mohammad A Siddiqi
(74) *Attorney, Agent, or Firm* — Buchanan Ingersoll & Rooney PC

(57) ABSTRACT

For protection of multipart system applications using a cryptographically protected package, a package map and a package object store for decryption and verification at runtime on the target device platform, a method including associating a device class with a set of content signing and encryption keys; signing application files based on the device class of the target device platform; aggregating application files into a file container based on a structured construct; encrypting application files/file containers with an encryption key associated with the device class; generating a package map and object stores for cryptographic artifacts and detached package metadata for passwords associated with the device package; building, the device package and update packages of the device package, detached package metadata, and package install scripts for the target device (Continued)

platform; publishing, the update packages signed with update package provider and update package publisher signing keys, and encrypted with target device encryption key.

16 Claims, 14 Drawing Sheets

(51) Int. Cl.
    *H04L 9/30*     (2006.01)
    *G06F 8/65*     (2018.01)
    *G06F 8/61*     (2018.01)

(52) U.S. Cl.
    CPC ............ *G06F 21/45* (2013.01); *H04L 9/0822* (2013.01); *H04L 9/0825* (2013.01); *H04L 9/30* (2013.01)

(58) Field of Classification Search
    CPC . H04L 9/14; H04L 9/3247; H04L 9/30; H04L 9/0863; H04L 2209/805
    See application file for complete search history.

(56) References Cited

U.S. PATENT DOCUMENTS

| | | | |
|---|---|---|---|
| 10,492,045 B2 * | 11/2019 | Li | H04L 9/0643 |
| 2006/0236083 A1 * | 10/2006 | Fritsch | H04L 67/303 |
| | | | 713/1 |
| 2009/0210702 A1 * | 8/2009 | Welingkar | H04W 12/35 |
| | | | 713/156 |
| 2013/0031366 A1 * | 1/2013 | Simske | H04L 9/3247 |
| | | | 713/168 |
| 2014/0227976 A1 * | 8/2014 | Callaghan | H04W 4/50 |
| | | | 455/41.2 |
| 2015/0215126 A1 * | 7/2015 | Ashdown | H04L 9/3247 |
| | | | 713/171 |
| 2015/0372997 A1 | 12/2015 | Lokamathe et al. | |
| 2016/0219077 A1 | 7/2016 | Pandya | |
| 2016/0253517 A1 | 9/2016 | Mori et al. | |
| 2018/0248887 A1 | 8/2018 | Sayed et al. | |
| 2018/0255074 A1 | 9/2018 | Li et al. | |

* cited by examiner

FIG. 2

| Name | Key File | Object ID | Key Type | Key Size | Key Usage | Key Password | Key Attribute | Timestamp | Status |
|---|---|---|---|---|---|---|---|---|---|
| skey_1 | skey_1.pem | 27 | RSA | 3072 | Signing | | Production | May 1, 2018 10:01:40 AM | Activated |
| skey_2 | skey_2.pem | 36 | RSA | 2048 | Signing | | Production | May 12, 2018 11:10:02 AM | Activated |
| skey_3 | skey_3.pem | 15 | RSA | 2048 | Signing | | Production | May 23, 2018 3:15:40 PM | Activated |
| ekey_1 | ekey_1.pem | 96 | RSA | 2048 | Encryption | | Production | Jul 1, 2018 2:34:24 PM | Activated |
| ekey_2 | ekey_2.pem | 74 | RSA | 2048 | Encryption | ******** | Non-Production | Aug 12, 2018 3:43:20 PM | Disabled |
| ekey_3 | ekey_3.pem | 5 | RSA | 3072 | Encryption | ******** | Non-Production | Sep 17, 2018 4:12:38 PM | Activated |
| ekey_4 | ekey_4.pem | 19 | RSA | 2048 | Encryption | | Non-Production | Oct 21, 2018 9:06:27 AM | Activated |

Keys

FIG. 8

Object Store (Primary) 802

| Object Type | Object ID | Object Value | Object Length |
|---|---|---|---|
| Key | 27 | [vkey_1.pem] | 2048 |
| Key | 36 | [vkey_2.pem] | 2048 |
| Key | 15 | [vkey_3.pem] | 2048 |
| Key | 96 | [dkey_1.pem] | 2048 |
| Key | 74 | [dkey_2.pem] | 2048 |
| Key | 5 | [dkey_3.pem] | 2048 |
| Key | 19 | [dkey_4.pem] | 2048 |
| Certificate | 21 | [cert_1.der] | 1024 |
| Certificate | 4 | [cert_2.der] | 1024 |

File Container (concatenate-tag)
The files file1.bin, file2.bin and file3.bin are merged with preamble and postamble tags as separators.

1202 — e86ff7fa-28fd-4fla1-a3ee-cf8ed999a53b
1204 — <file-container>
1206 — <file=file1.bin length=76800>
         file1.bin
1208 — </file>
       <file=file2.bin length=153600>
         file2.bin
       </file>
       <file=file3.bin length=25600>
         file3.bin
       </file>
1210 — </file-container>

SYSTEM AND METHOD FOR PROTECTION OF MULTIPART SYSTEM APPLICATIONS USING A CRYPTOGRAPHICALLY PROTECTED PACKAGE, A PACKAGE MAP AND A PACKAGE OBJECT STORE FOR DECRYPTION AND VERIFICATION AT RUNTIME ON THE TARGET DEVICE PLATFORM

FIELD

This disclosure relates to the field of multipart system application package protection on a device platform for the Internet of Things (IoT) based on the issuance of cryptographically signed and encrypted artifacts by an update service and the decryption and verification of the application package at runtime on the device platform.

BACKGROUND

Digital signing of files in a package using a single code signing certificate issued by a certificate authority (CA) is common in the security industry to establish supply chain provenance. While this provides a degree of data integrity based on the key size, data confidentiality requires data encryption. This may be achieved today using public key infrastructure (PKI) asymmetric key pairs to wrap a symmetric encryption key.

However, there are limitations in such approaches: (a) the scalability to large scale system software on a target platform that compromises of a plurality of software modules (or components) such as code files, data files, configuration files, folders (collection of files), distributed by a plurality of content providers; (b) distribution of cryptographic artifacts (keys and certificates) to multiple target platforms with target-specific cryptographic artifacts for privacy; (c) managing the distribution of the associated cryptographic artifacts along with the system software; (d) protection of secrets (such as for example, passwords) associated with the distributed cryptographic artifacts; and (e) protection of the intellectual property (i.e. system software) installed on the target platform, against theft and/or reverse engineering, once exported to an owner/operator of the target platform in a foreign country.

SUMMARY

In sharp contrast to the above-mentioned current methods, the proposed system builds a device package for a target platform comprising of all solution components as an aggregated (e.g., tar) entity with digital signing and encryption of content as either standalone files and/or file containers, with a device package map to facilitate verification and decryption of the solution components on the target platform at runtime.

The method of the disclosed system overcomes serious limitations of current methods by providing management of cryptographic artifacts associated with the device package with embedded object stores and device package map.

The disclosed method can provide significant improvements and efficiencies to retrofit legacy devices for protection with cryptographic privacy and integrated key management.

BRIEF DESCRIPTION OF THE DRAWINGS

The disclosure is best understood from the following detailed description when read in connection with the accompanying drawings. According to common practice, various features/elements of the drawings may not be drawn to scale. Common numerical references represent like features/elements. The following figures are included in the drawings:

FIG. 2 is a schematic diagram illustrating a method to manage a plurality of cryptographic signing and encryption keys associated with the generation of a device package for the target platform, in accordance with various exemplary embodiments of the disclosed system.

FIG. 8 is a schematic diagram illustrating an object store based on object identifiers for the cryptographic artifacts within a structured device package for the target platform, in accordance with various exemplary embodiments of the disclosed system.

FIG. 12 is a schematic diagram of a structured file container construct, in accordance with various exemplary embodiments of the disclosed system.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Although the disclosure is illustrated and described herein with reference to specific embodiments, the disclosure is not intended to be limited to the details shown herein. Rather, various modifications may be made in the details within the scope and range of equivalents of the claims and without departing from the scope of the disclosure.

A device class is associated to a set of content signing and encryption keys. The device class keys are used to sign and optionally encrypt content (e.g. code files, data files).

A file may be signed with the device class signing key. A file may be signed with the device class signing key and encrypted with the device class encryption key. A plurality of files may each be signed with the device class signing key and encrypted as an aggregation (file container) with the device class encryption key, wherein the aggregation may be performed as a bundle of files (e.g., tar), as a compressed file (e.g., zip) or as a concatenation with tags for separators. The concatenation with tags may comprise a magic number (e.g., 16 bytes), a preamble marker (e.g. including a component file name and file size in bytes), and a postamble marker.

A device package for a device class may comprise a plurality of files and a plurality of file containers. The device package may be signed with the provider key, co-signed with the publisher key, and encrypted with the device encryption key for over-the-air or over-the-wire delivery.

Disabling (or revoking) a signing or encryption key may automatically disable the device class, files, file containers and device packages that require the respective key for verification or decryption.

The device class signing and encryption keys may be assigned a key attribute (e.g. production, non-production). A device package attribute may be automatically derived based on the attribute of the associated signing and/or encryption key.

The device package map may comprise an association of file to signing and encryption keys.

The device object store may comprise a store descriptor and objects in the store. The objects may be of various types, such as for example, keys and certificates.

The device package generated (by the build) may comprise files, file containers, a device package map, a device primary object store, a passwords object store and, in some embodiments, a symmetric key.

A detached password object store (with base64 encoded passwords or passwords encrypted with a symmetric key) may optionally be generated during device package build for password protected private keys in the device object store.

Figure 1:
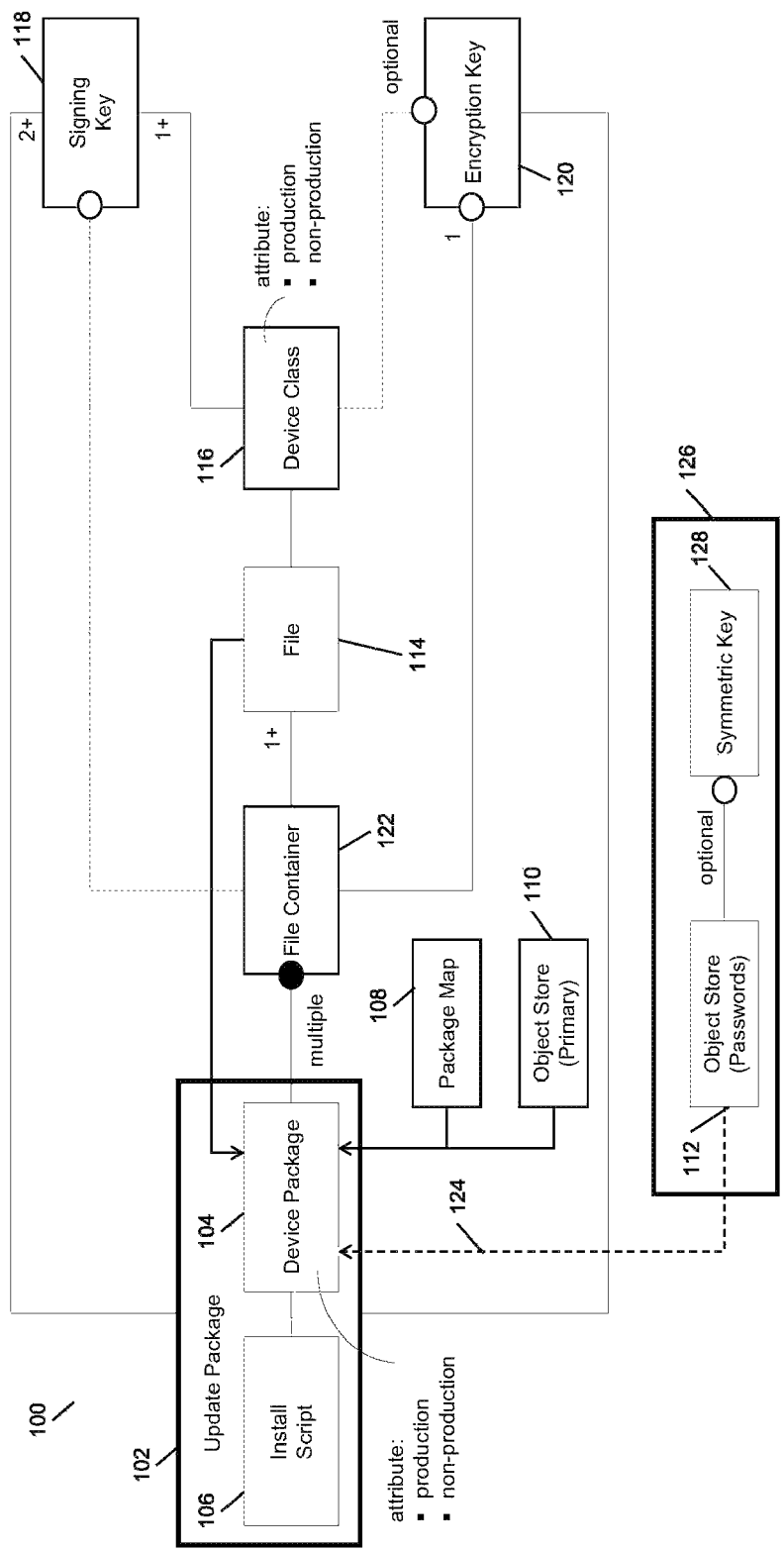
FIG. 1 is a graphical representation of entity relationships associated with the generation and distribution of a device package to a target platform, in accordance with various exemplary embodiments of the disclosed system.

Referring to FIG. 1, an update package 102 may comprise a device package 104 and an install script 106, wherein the device package 104 may comprise multiple files 114, multiple file containers 122 that aggregate multiple files 114, a package map 108, and a primary object store 110. The passwords object store 112 and an optional symmetric key 128 associated with the object store 112 may be distributed detached from the device package 104. The device class 116 may be associated with at least one signing key 118 and an optional encryption key 120. The file 114 may be associated with a device class 116. The file container 122 may derivatively be associated with a device class wherein all files 114 in the file container 122 are associated with a matching device class 116. The file container 122 may be associated with an optional signing key and an encryption key 120. The device class 116 may be assigned an attribute (for example, production or non-production). In some embodiments, the device package 104 may implicitly be assigned an attribute based on the associated device class 116.

Referring to FIG. 2, a key 202 may comprise an asymmetric signing (public-private) key pair and an asymmetric encryption (public-private) key pair. A key definition 204 may comprise a key name 206, a signing (private) or encryption (public) key file 208, an unique object ID 210 in the primary object store 110, a key type 212 (for example, RSA, ECDSA), a key size 214 (for example, 2048, 3072), a key usage 216 (signing or encryption), a key attribute 220 (for example, production or non-production), a timestamp 222, and a status 224 (for example, activated or disabled). In some embodiments, the key 202 may further comprise (not shown in FIG. 2) the asymmetric verification (public) key file, the asymmetric decryption (private) key file, and an optional key password 218 for the asymmetric decryption (private) key file.

Figure 3:
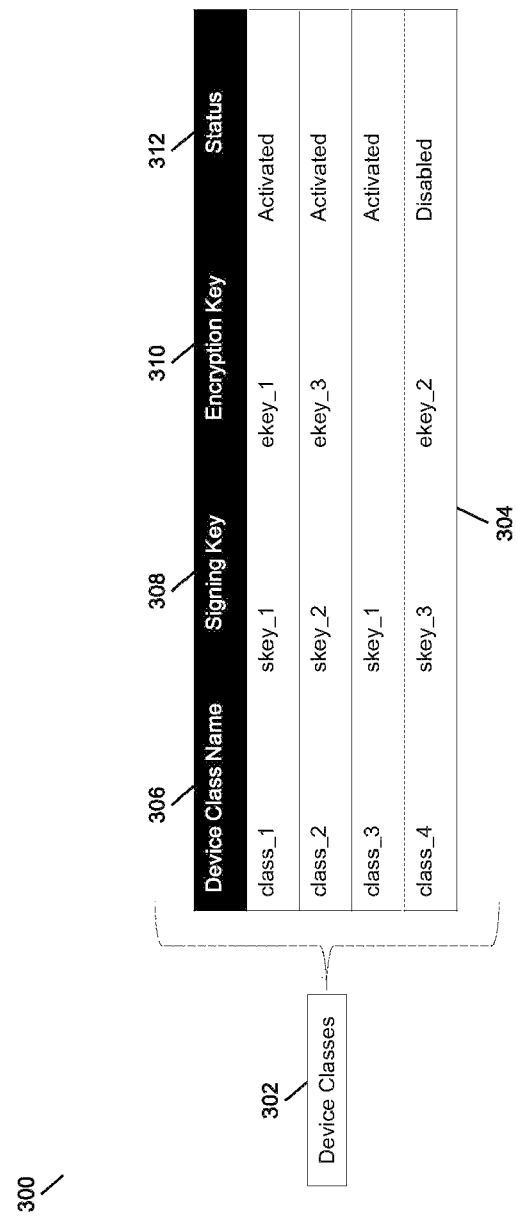
FIG. 3 is a schematic diagram illustrating a method to associate device classes to cryptographic artifacts for the generation of a device package for the target platform, in accordance with various exemplary embodiments of the disclosed system.

Referring to FIG. 3, a device class 302 may comprise at least one asymmetric signing (private) key and an optional asymmetric encryption (public) key. A device class definition 304 may comprise a device class name 306, a signing key name 308, an encryption key name 310, and a derived (implicit) status 312 (for example, activated or disabled) based on the status of the associated keys.

Figure 4:
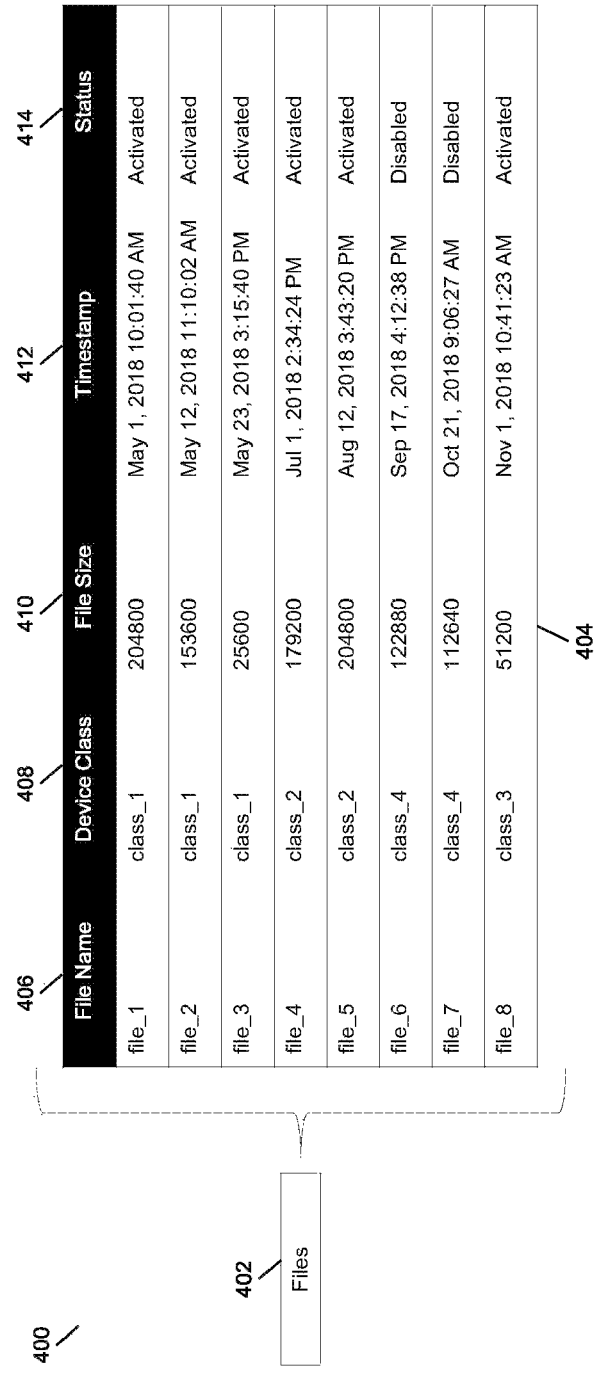
FIG. 4 is a schematic diagram illustrating a method to sign and optionally encrypt files based on device class to include in a device package for the target platform, in accordance with various exemplary embodiments of the disclosed system.

Referring to FIG. 4, a file 402 may comprise a device class name 408, a file size 410 for inclusion in the device package map 108, a timestamp 412, and a derived (implicit) status 414 (for example, activated or disabled) based on a status of the device class name 408. The file 402 may further comprise (not shown in FIG. 4) a directive to optionally disable encryption of the file 402 with the encryption key of the associated device class 408, as the encryption may be applied at the file container 122 level.

Figure 5:
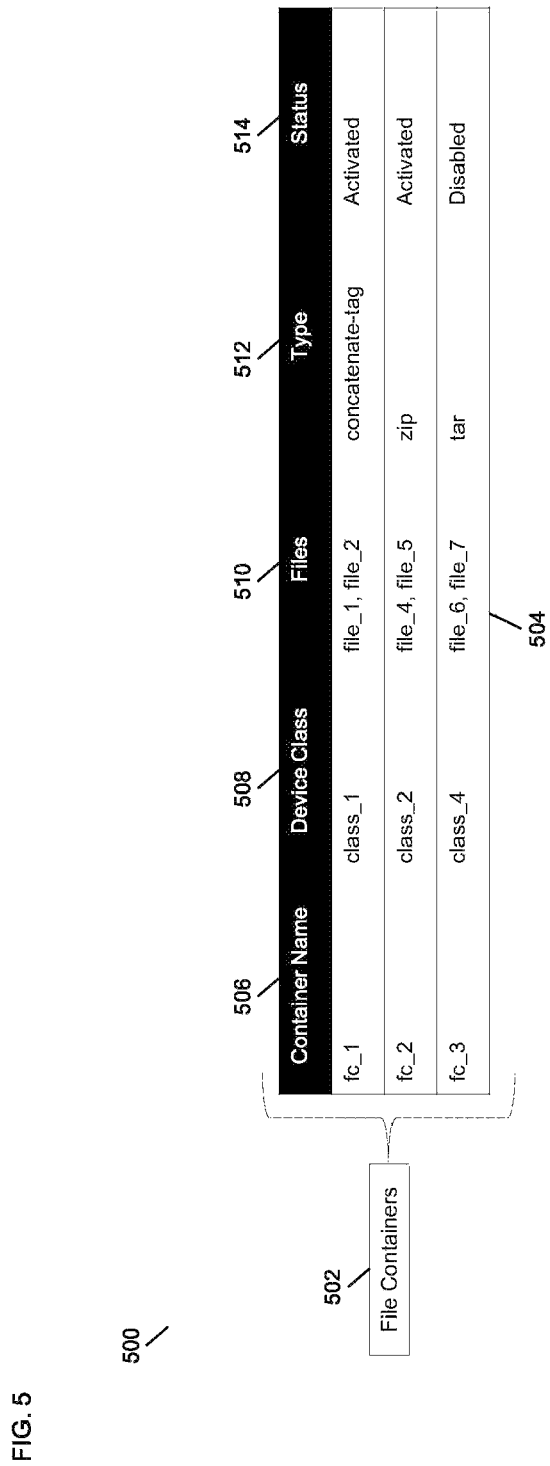
FIG. 5 is a schematic diagram illustrating a method to create a container for a plurality of files based on device class to include in a device package for the target platform, in accordance with various exemplary embodiments of the disclosed system.

Referring to FIG. 5, a file container 502 may comprise a container name 506, a device class name 508, a set of file names 510 (404), a type 512 (for example, concatenate, zip, tar) for generation of a structured file container construct during device package build, and a derived (implicit) status 514 (for example, activated or disabled) based on a status of the device class name 508. The file container 502 may further comprise (not shown in FIG. 5) a magic number (for example, 16 bytes) for inclusion in the structured file container construct.

Figure 6:
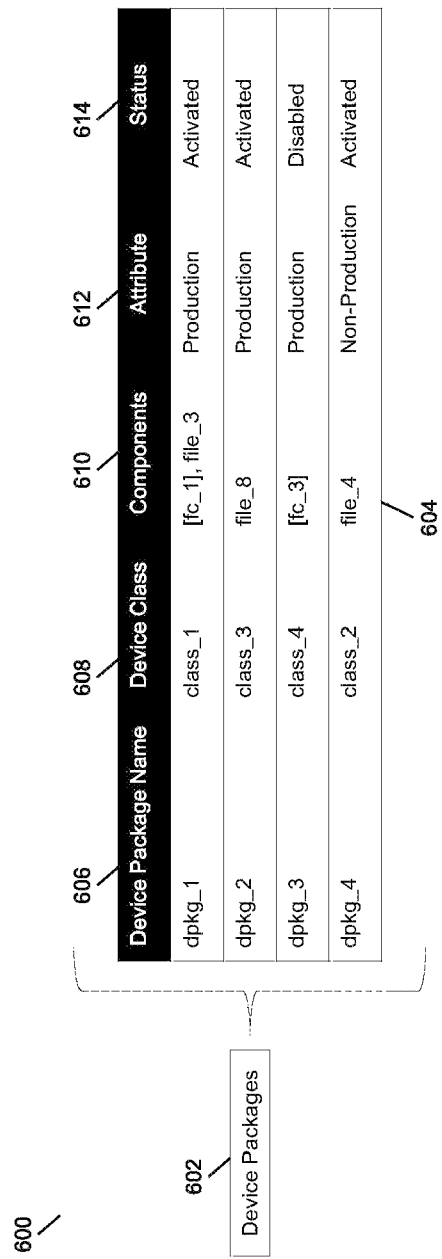
FIG. 6 is a schematic diagram illustrating a method to create a structured device package for the target platform, using files, file containers and package metadata, in accordance with various exemplary embodiments of the disclosed system.

Referring to FIG. 6, a device package 602 may comprise a device package name 606, a device class name 608, a set of components 610 wherein the component may be a file name (404) or a file container name (504), an attribute 612 derived based on the associated device class name 608, and a derived (implicit) status 614 (for example, activated or disabled) based on a status of the device class name 608. The device package 602 may further comprise (not shown in FIG. 6) a directive for the password protection method (for example, base64 encoding or encryption with a specified symmetric key).

Figure 7:
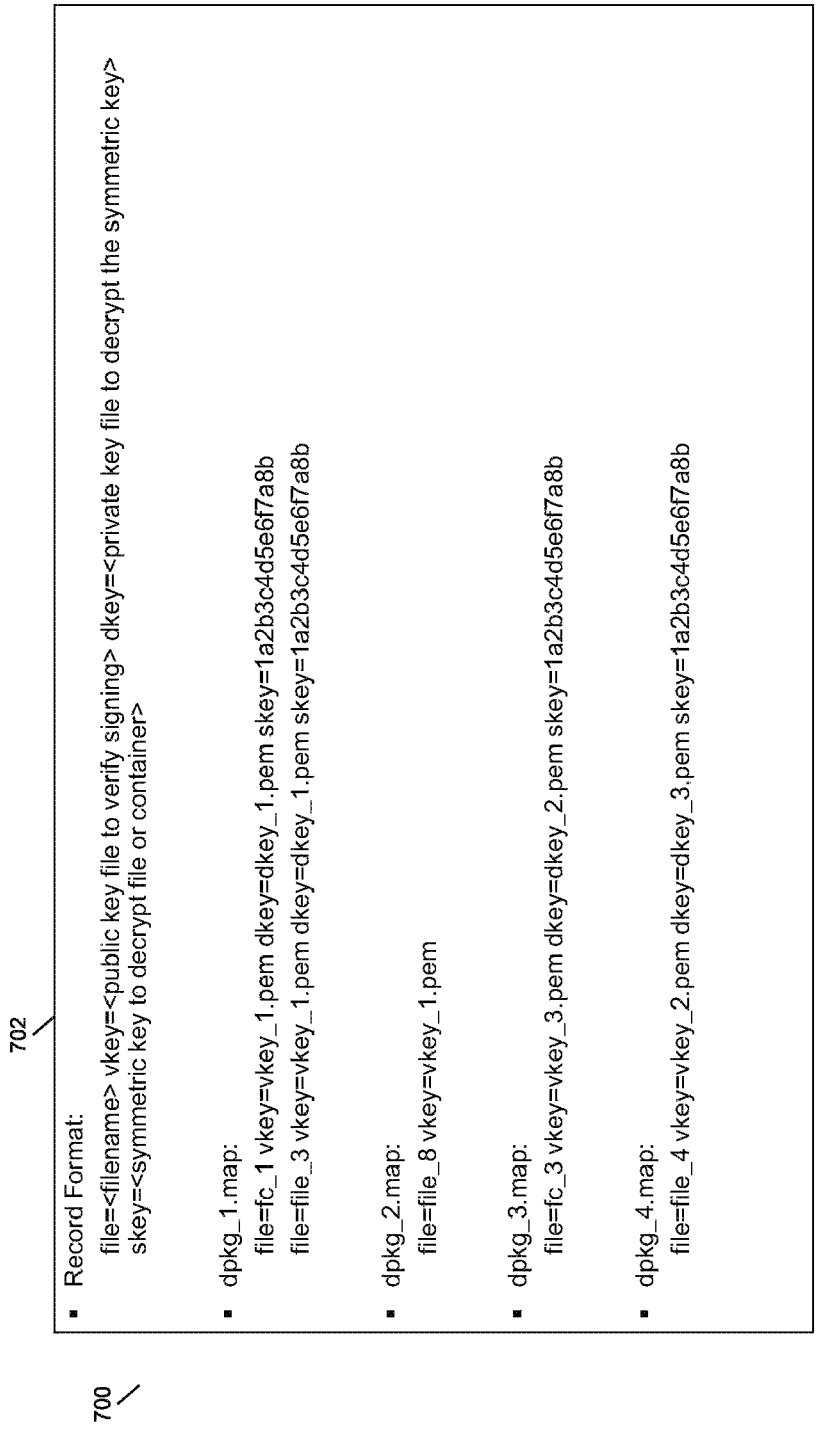
FIG. 7 is a schematic diagram illustrating a method to map the cryptographic keys to files and file containers within a structured device package for the target platform, in accordance with various exemplary embodiments of the disclosed system.

Referring to FIG. 7, a device package map 702 may comprise a plurality of records that comprise a file name, a public key file to verify signing on a target device platform, a decryption key file to decrypt the symmetric key, and the wrapped symmetric key to decrypt the file or container.

Figure 9:
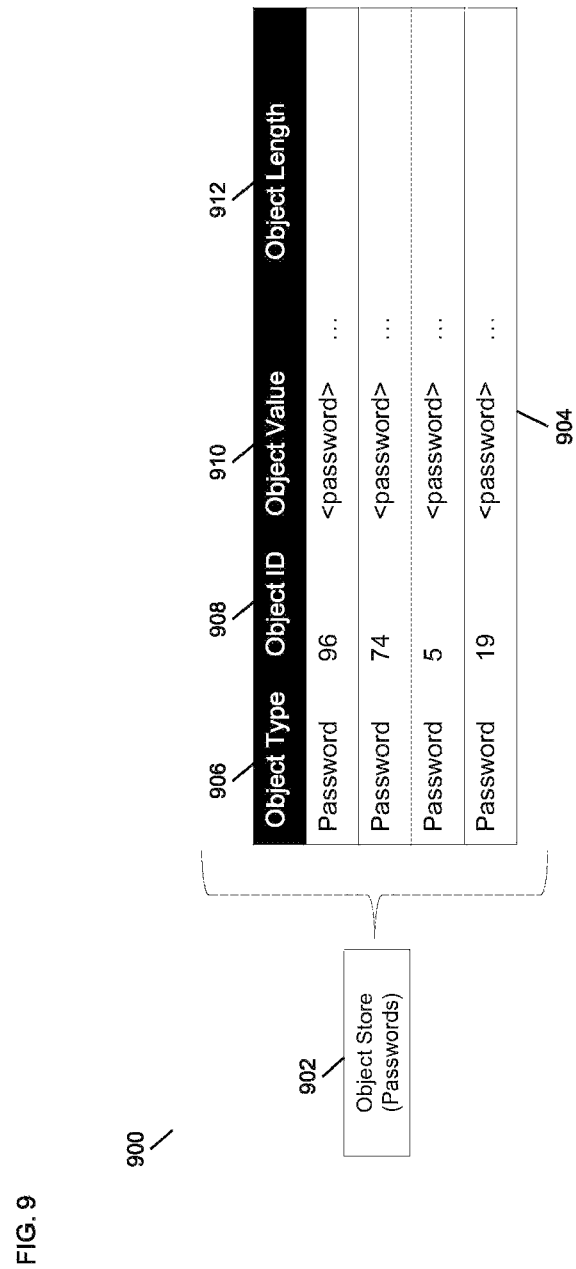
FIG. 9 is a schematic diagram illustrating an object store for encoded or encrypted passwords associated with cryptographic artifacts within a structured device package for the target platform, in accordance with various exemplary embodiments of the disclosed system.

Referring to FIG. 8 and FIG. 9, a primary object store 802 may comprise an object type 806 (for example, key or certificate), an unique object identifier 808, an object value 810 based on the object type 806 (for example, a key file or certificate file), and an object length 812. The object identifiers 808 may be used at runtime on the target device platform to retrieve associated key passwords from the detached passwords object store 902.

Referring to FIG. 8 and FIG. 9, a passwords object store 902 may comprise an object type 906 (for example, password), an unique object identifier 908, an object value 910 based on the object type 906 (for example, a password), and an object length 912. The object value 910 may be base64 encoded or encrypted with a device package symmetric key 128. The object identifiers 908 may match the object identifiers 808 of key files 810 in the primary object store 802.

Figure 10:
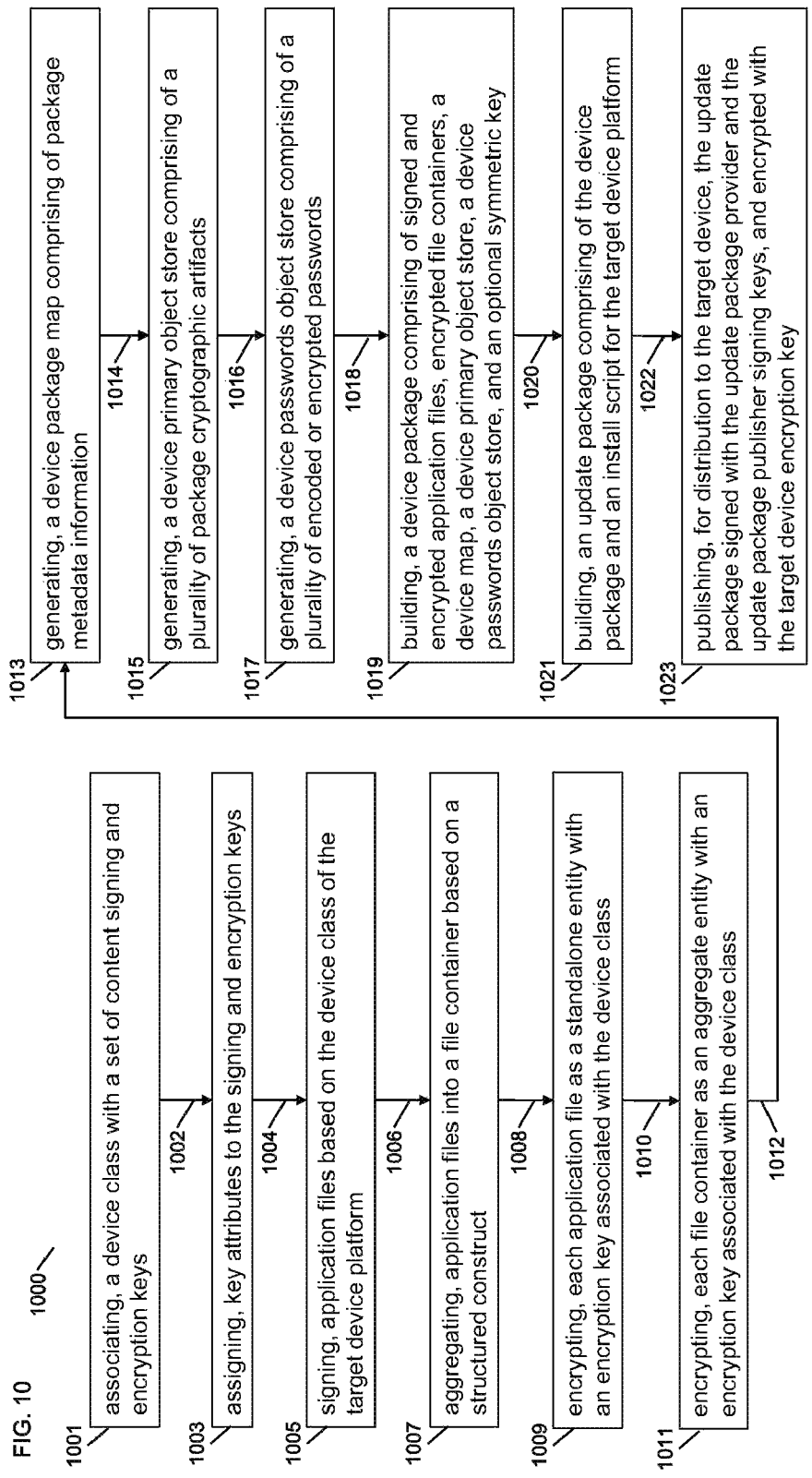
FIG. 10 is a flowchart illustrating a method for the generation and distribution of a cryptographically protected device package for a target device platform, in accordance with various exemplary embodiments of the disclosed system.

Referring to FIG. 10, a method 1000 of generating and distributing cryptographically protected multipart system applications on a target device platform, using a plurality of device class based asymmetric signing and encryption keys, application files, file containers, a device package map, a device primary object store for cryptographic artifacts, a device passwords object store, a symmetric encryption key, a provider signing key, a publisher signing key, a device encryption key, an install script, and a device package, is described. At step 1001, a device class may be associated with a set of content signing and encryption keys. At step 1003, key attributes may be assigned to the signing and encryption keys. At step 1005, application files may be signed based on the device class of the target device platform. At step 1007, application files may be aggregated into a file container based on a structured construct. At step 1009, each application file may be encrypted as a standalone entity with an encryption key associated with the device class. At step 1011, each file container may be encrypted as an aggregate entity with an encryption key associated with the device class. At step 1013, a device package map may be generated comprising package metadata information. At step 1015, a device primary object store may be generated comprising a plurality of package cryptographic artifacts. At step 1017, a device passwords object store may be generated comprising a plurality of encoded or encrypted passwords. At step 1019, a device package may be built comprising signed and encrypted application files, encrypted file containers, a device map, a device primary object store, a device passwords object store, and an optional symmetric key. At step 1021, an update package may be built comprising the device package and an install script for the target device platform. At step 1023, an update package may be published for distribution to the target device, signed with the update package provider and the update package publisher signing keys, and encrypted with the target device encryption key.

Figure 11:
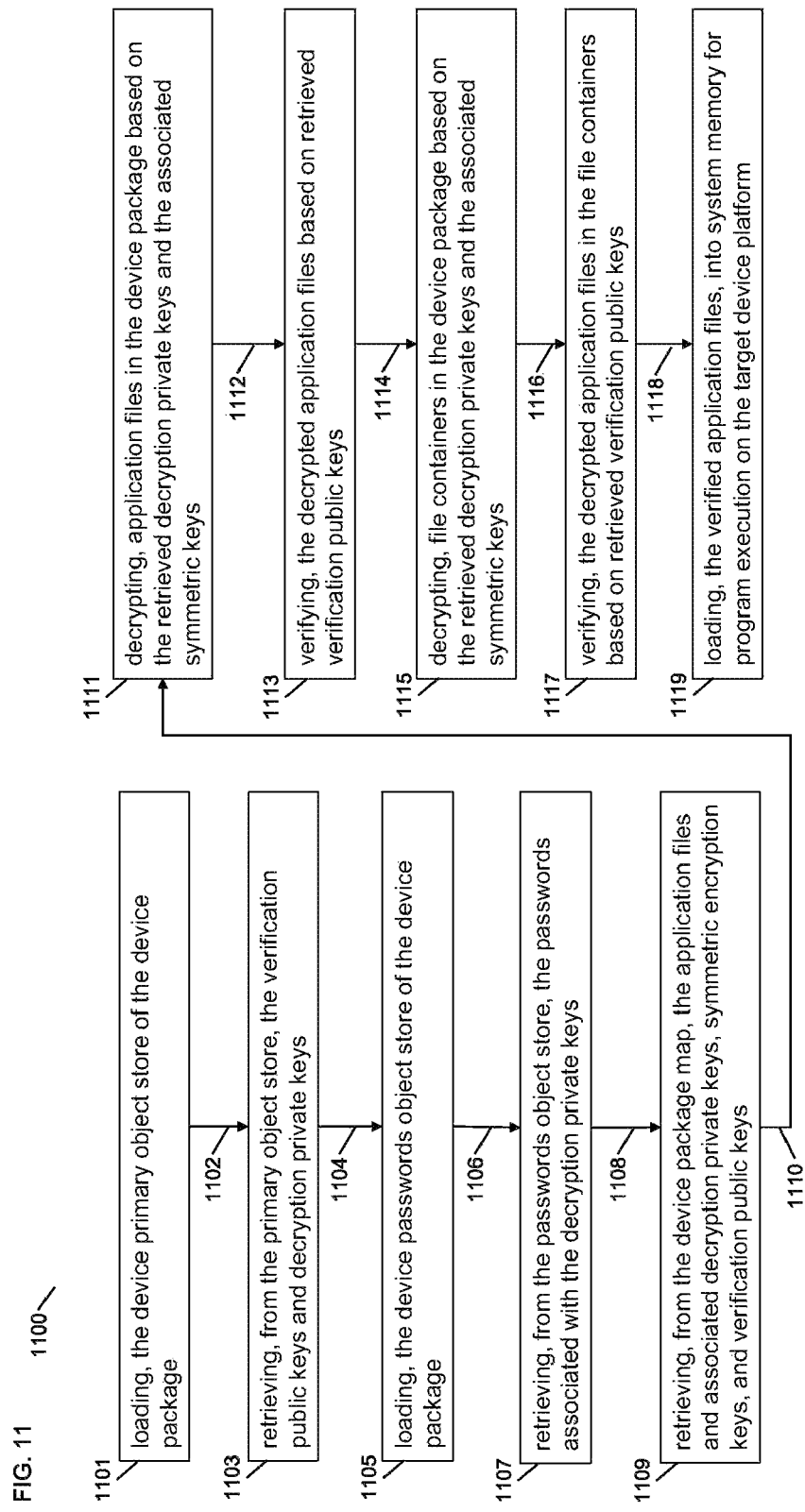
FIG. 11 is a flowchart illustrating a method for the decryption and verification of a cryptographically protected device package on a target device platform, in accordance with various exemplary embodiments of the disclosed system.

Referring to FIG. 11, a method of decrypting, verifying and loading a cryptographically protected device package on a target device platform, using a plurality of device class based asymmetric signing and encryption keys, application files, file containers, a device package map, a device primary object store for cryptographic artifacts, a device passwords object store, and a symmetric encryption key, is described. At step 1101, the device primary object store of the device package is loaded. At step 1103, the verification public keys and decryption private keys are retrieved from the primary object store. At step 1105, the device passwords object store of the device package are loaded. At step 1107, the passwords associated with the decryption private keys are retrieved from the passwords object store. At step 1109, the application files and associated decryption private keys, symmetric encryption keys, and verification public keys are retrieved from the device package map. At step 1111, application files in the device package are decrypted based on the retrieved decryption private keys and the associated symmetric keys. At step 1113, the decrypted application files are verified based on retrieved verification public keys. At step 1115, file containers in the device package are decrypted based on the retrieved decryption private keys and the associated symmetric keys. At step 1117, the decrypted application files in the file containers are verified based on retrieved verification public keys. At step 1119, the verified application files are loaded into system memory for program execution on the target device platform.

Referring to FIG. 12, a file container schematic 1200 may comprise a magic number 1202 (for example, a 16-byte globally unique identifier), a file container preamble tag 1204, a file preamble tag 1206 that comprises at least file name and file length attributes, a file postamble tag 1208, and a file container postamble tag 1210. The schematic may comprise a plurality of files with preamble and postamble tags as separators.

Figure 13:
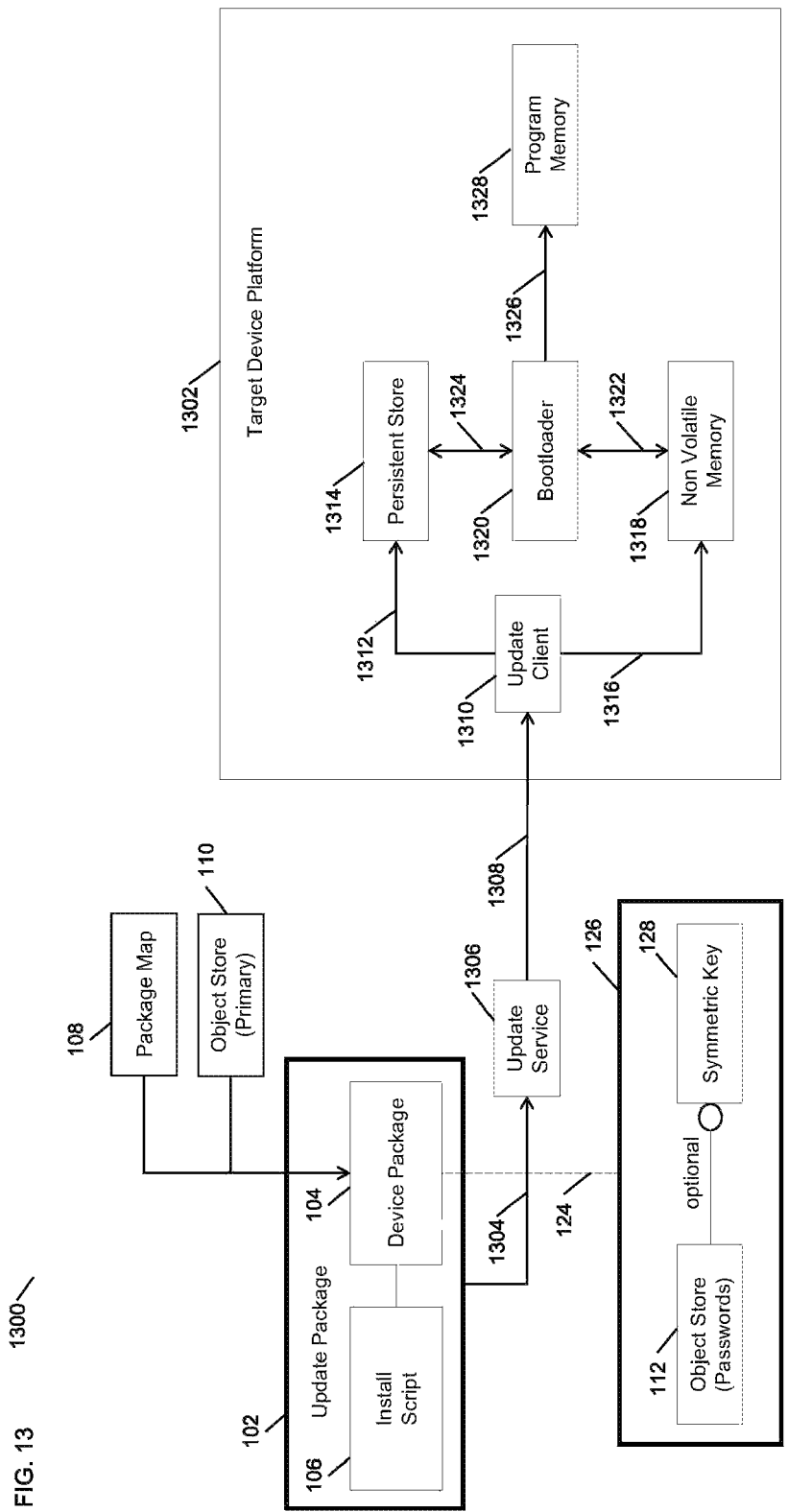
FIG. 13 is a schematic diagram illustrating the distribution of the protected device package and the detached package metadata to a target device platform, storage of the protected device package and the detached package metadata on the target device platform, and loading of the decrypted and verified device package into program memory at runtime, in accordance with various exemplary embodiments of the disclosed system.

Referring to FIG. 13, at step 1304 the update service 1306 may publish a first update package 102 comprising a protected device package 104 and a first package install script 106. The protected device package 104 may further comprise a package map 108 and a primary object store 110. At step 1304 the update service 1306 may also publish a second update package 102 comprising a detached password object store 112, a symmetric key 128 for the protected device package 104 and a second package install script 106. At step 1308, the update client 1310 on the target device platform 1302 may request update packages from the update service 1306. At step 1312, the update client 1310, may execute the first package install script 106 to store the received protected device package 104 on a persistent store 1314 on the target device platform 1302. At step 1316, the update client 1310 may execute the second package install script 106 to store the received detached package metadata 126 in nonvolatile memory 1318 on the target device platform 1302. At step 1324, the bootloader 1320 on the target device platform 1302 may retrieve the protected device package on the persistent store 1314, and further decrypt and verify the file containers and files with the package map and key passwords retrieved at step 1322 with the symmetric key 128 from the password object store 112 in the package metadata 126 stored in nonvolatile memory 1318 on the target device platform 1302. At step 1326 the decrypted and verified system application files are loaded into the program memory 1328 for program execution.

In one exemplary embodiment of the disclosed method, the protected device package 104 and the detached package metadata 126 may be published together as a single update package with a consolidated install script 106 to the update client 1310 on the target device platform 1302.

In one exemplary embodiment of the disclosed method, the application file may be signed with a plurality of signing keys and the device package map may accordingly comprise a plurality of verification keys for the application file. The device package map may further comprise a logical operator (AND or OR) specification for use with the plurality of verification keys.

In yet another exemplary embodiment of the disclosed method, the symmetric key and the passwords object store associated with the device package may be detached from the device package for security purposes and made available on the target device platform via alternate methods, such as, for example, a protected nonvolatile memory on the device.

Figure 14:
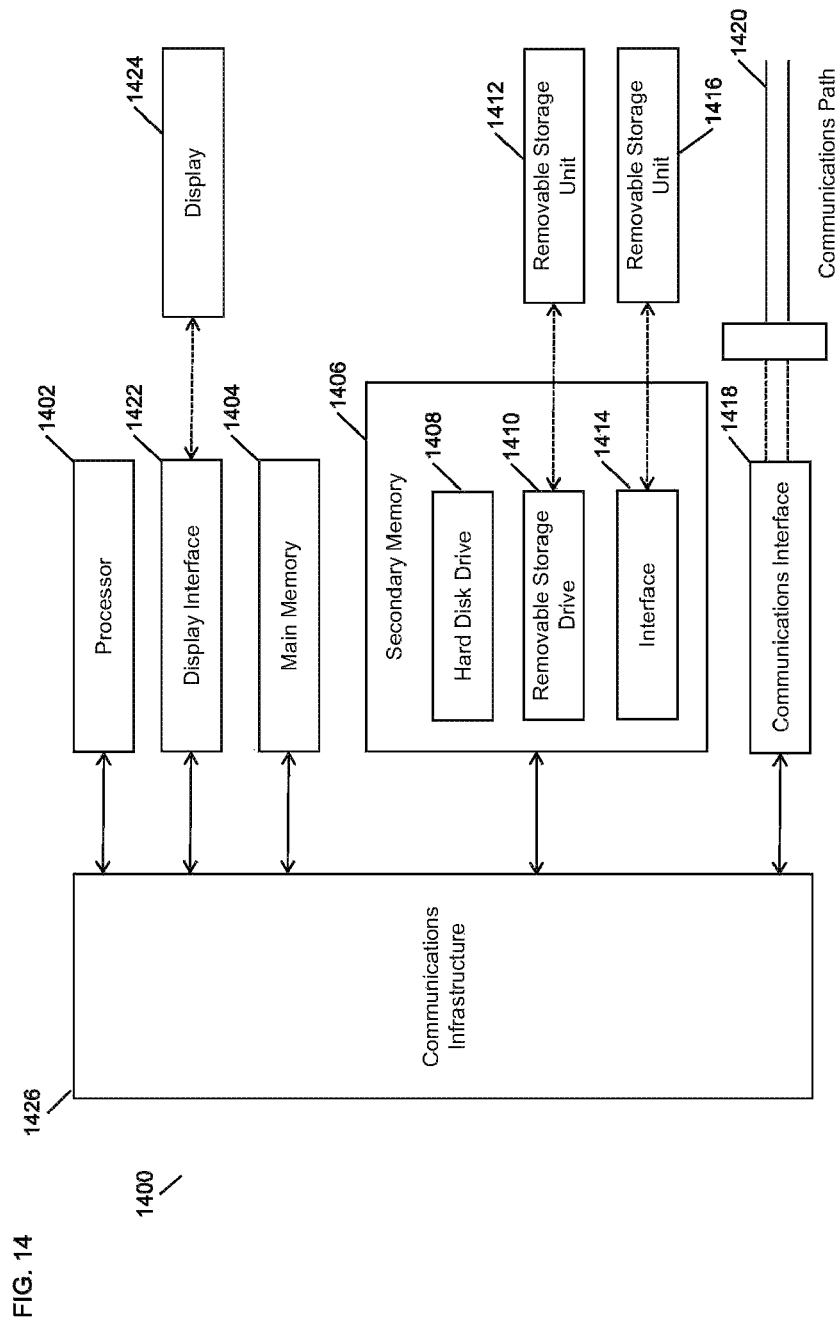
FIG. 14 is a diagram of an exemplary computer system in which embodiments of the method of generating a device package for a target device platform by device class, distributing the device package as an update package, and decrypting, verifying and loading the cryptographically protected device package on the target device platform can be implemented.

FIG. 14 illustrates an exemplary computer system 1400 in which embodiments of the present disclosure, or portions thereof, may be implemented as computer-readable code. For example, the network systems and architectures disclosed here (device package, file containers, device package map, device primary object store, device password object store, etc.) can be implemented in computer system 1400 using hardware, software, firmware, non-transitory computer readable media having instructions stored thereon, or a combination thereof and may be implemented in one or more computer systems or other processing systems. Hardware, software, or any combination of such may embody any of the modules and components used to implement the architectures and systems disclosed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the disclosure are described in terms of this example computer system 1400. After reading this description, it will become apparent to a person skilled in the relevant art how to implement the disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1402 may be a special purpose or a general-purpose processor device. As will be appreciated by persons skilled in the relevant art, processor device 1402 may also be a single processor in a multi-core/multiprocessor system, such system operating alone, or in a cluster of computing devices operating in a cluster or server farm. Processor device 1402 is connected to a communication infrastructure 1426, for example, a bus, message queue, network, or multi-core message-passing scheme.

The computer system 1400 also includes a main memory 1404, for example, random access memory (RAM) or flash memory, and may include a secondary memory 1406. Secondary memory 1406 may include, for example, a hard disk drive 1408, removable storage drive 1410. Removable storage drive 1410 may be a floppy disk drive, a magnetic tape drive, an optical disk drive, a flash memory, or the like.

The removable storage drive 1412 reads from and/or writes to a removable storage unit 1412 in a well-known manner. Removable storage unit 1412 may be a floppy disk, magnetic tape, optical disk, etc. which is read by and written to by removable storage drive 1410. As will be appreciated by persons skilled in the relevant art, removable storage unit 1412 includes a non-transitory computer usable storage medium having stored therein computer software and/or data.

In alternative implementations, secondary memory 1406 may include other similar means for allowing computer programs or other instructions to be loaded into computer system 1400. Such means may include, for example, a removable storage unit 1416 and an interface 1414. Examples of such means may include a program cartridge and cartridge interface (such as that found in video game devices), a removable memory chip (such as an EPROM, or PROM) and associated socket, and other removable storage units 1416 and interfaces 1414 which allow software and data to be transferred from the removable storage unit 1416 to computer system 1400.

The computer system 1400 may also include a communications interface 1418. Communications interface 1418 allows software and data to be transferred between computer system 1400 and external devices. Communications interface 1418 may include a modem, a network interface (such as an Ethernet card), a communications port, a PCMCIA slot and card, or the like. Software and data transferred via communications interface 1418 may be in the form of signals, which may be electronic, electromagnetic, optical, or other signals capable of being received by communications interface 1418. These signals may be provided to communications interface 1418 via a communications path 1420. Communications path 1420 carries signals and may be implemented using wire or cable, fiber optics, a phone line, a cellular phone link, an RF link or other communications channels.

The computer system 1400 may also include a computer display 1424 and a display interface 1422. According to embodiments, the display used to display the GUIs and dashboards shown in FIGS. 1-13 described above may be the computer display 1424, and the console interface may be display interface 1422.

In this document, the terms "computer program medium," "non-transitory computer readable medium," and "computer usable medium" are used to generally refer to media such as removable storage unit 1412, removable storage unit 1416, and a hard disk installed in hard disk drive 1408. Signals carried over communications path 1420 can also embody the logic described herein. Computer program medium and computer usable medium can also refer to memories, such as main memory 1404 and secondary memory 1406, which can be memory semiconductors (e.g., DRAMs, etc.). These computer program products are means for providing software to computer system 1400.

Computer programs (also called computer control logic) are stored in main memory 1404 and/or secondary memory 1406. Computer programs may also be received via communications interface 1418. Such computer programs, when executed, enable computer system 1400 to implement the present disclosure as discussed herein. In particular, the computer programs, when executed, enable processor device 1402 to implement the processes of the present disclosure, such as the stages in the methods illustrated by the flowcharts in FIGS. 1-13, discussed above. Accordingly, such computer programs represent controllers of the computer system 1400. Where the present disclosure is implemented using software, the software may be stored in a computer program product and loaded into computer system 1400 using removable storage drive 1412, interface 1414, and hard disk drive 1408, or communications interface 1418.

Embodiments of the disclosure also may be directed to computer program products comprising software stored on any computer useable medium. Such software, when executed in one or more data processing device, causes a data processing device(s) to operate as described herein. Embodiments of the disclosure employ any computer useable or readable medium. Examples of computer useable mediums include, but are not limited to, primary storage devices (e.g., any type of random access memory, etc.), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

Conclusion

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance. Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Although the present disclosure is illustrated and described herein with reference to specific embodiments, the disclosure is not intended to be limited to the details shown. Rather, various modifications may be made in the details within the scope and range equivalents of the claims and without departing from the disclosure.

What is claimed is:

1. A method of generating and distributing cryptographically protected multipart system applications on a target device platform, using a plurality of device class based asymmetric signing and encryption keys, application files, file containers, a device package map, a device primary object store for cryptographic artifacts, a device passwords object store, a symmetric encryption key, a provider signing key, a publisher signing key, a device encryption key, an install script, and a device package, the method comprising:
   associating a device class with a set of content signing and encryption keys;
   assigning key attributes to the signing and encryption keys;
   signing application files based on the device class of the target device platform;
   aggregating application files into a file container based on a structured construct;
   encrypting each application file as a standalone entity with an encryption key associated with the device class;
   encrypting each file container as an aggregate entity with an encryption key associated with the device class;
   generating a device package map comprising of package metadata information;
   generating a device primary object store comprising of a plurality of package cryptographic artifacts;
   generating a device passwords object store comprising of a plurality of encoded or encrypted passwords;
   building a device package comprising of signed and encrypted application files, encrypted file containers, a device map, a device primary object store, a device passwords object store, and an optional symmetric key;
   building an update package comprising the device package and an install script for the target device platform; and
   publishing, for distribution to the target device, the update package signed with the update package provider and the update package publisher signing keys, and encrypted with the target device encryption key.

2. The method of claim 1, wherein the encryption is performed with a symmetric key, and wherein the symmetric key is encrypted with the asymmetric public key associated with the device class.

3. The method of claim 1, wherein the device package map comprises package metadata information to associate the cryptographic verification and decryption keys for an application file or file container included in the device package.

4. The method of claim 1, wherein the device primary object store comprises cryptographic objects, and is formatted to be loaded into a persistent store on the target device for real-time retrieval of objects by type and an object identifier.

5. The method of claim 1, wherein the device passwords object store comprises at least one of base64 encoded and passwords encrypted with a symmetric key, and is formatted to be loaded into a persistent store on the target device for real-time retrieval of passwords by object identifier associated with a cryptographic private key object in the primary object store.

6. The method of claim 1, wherein disabling a cryptographic signing or encryption key associated with a device class automatically disables the associated device packages to prevent subsequent distribution of the associated device packages.

7. The method of claim 1, wherein the signing and encryption keys may be assigned key attributes to mark the keys for production or non-production usage, and wherein the generated device packages inherit the usage attribution.

8. The method of claim 1, wherein the file container comprises application files associated with a matching device class and key attribution, and wherein the device package comprises application files and file containers associated with a matching device class and key attribution.

9. The method of claim 1, wherein the application files in a file container may be constructed as a concatenation of files, an industry standard compressed zip file, or as an industry standard tar file.

10. The method of claim 9, wherein the concatenation of files may comprise a magic number tag for unique identification, a preamble tag that includes at least the application file name and size, and a postamble tag to serve as a delimiter of multipart content.

11. A method of decrypting, verifying and loading a cryptographically protected device package on a target device platform, using a plurality of device class based asymmetric signing and encryption keys, application files, file containers, a device package map, a device primary object store for cryptographic artifacts, a device passwords object store, and a symmetric encryption key, the method comprising:
  loading the device primary object store of the device package;
  retrieving, from the primary object store, the verification public keys and decryption private keys;
  loading the device passwords object store of the device package;
  retrieving, from the passwords object store, the passwords associated with the decryption private keys;
  retrieving, from the device package map, the application files and associated decryption private keys, symmetric encryption keys, and verification public keys;
  decrypting application files in the device package based on the retrieved decryption private keys and the associated symmetric keys;
  verifying the decrypted application files based on retrieved verification public keys;
  decrypting file containers in the device package based on the retrieved decryption private keys and the associated symmetric keys;
  verifying the decrypted application files in the file containers based on retrieved verification public keys; and
  loading the verified application files into system memory for program execution on the target device platform.

12. The method of claim 11, wherein the device primary object store and device passwords object store may be preloaded into a persistent store on the target device platform.

13. The method of claim 12, wherein the persistent store comprises nonvolatile memory, for real-time retrieval and performance during a power recycle.

14. The method of claim 11, wherein object identifiers for the decryption private keys retrieved from the device primary object store provide the attribute to retrieve the associated passwords from the device passwords object store.

15. The method of claim 11, wherein the device package map provides metadata information to decrypt and verify a plurality of application files and file containers of the device package on the target platform at runtime for just-in-time execution.

16. The method of claim 11, wherein the multipart system application resides cryptographically protected by a plurality of signing and encryption keys as data-at-rest on the target device platform, and wherein the multipart system application is decrypted and verified prior to each execution cycle on the target device platform.

* * * * *